US006033517A

United States Patent [19]

Chenetski

[11] Patent Number: 6,033,517
[45] Date of Patent: Mar. 7, 2000

[54] PROTECTION FROM EXCESSIVE HEATING OF COMPONENTS ON AN OBJECT DURING CURING OF PAINT ON A LOCALIZED AREA OF THE OBJECT

[75] Inventor: Dennis M. Chenetski, Hilliard, Ohio

[73] Assignee: Honda of America Mfg., Inc., Marysville, Ohio

[21] Appl. No.: 09/168,389

[22] Filed: Oct. 6, 1998

[51] Int. Cl.[7] ................................ B05D 1/32; B23B 35/00

[52] U.S. Cl. ............................ 156/282; 156/94; 427/140; 427/282; 427/374.1; 427/398.1

[58] Field of Search ................................ 156/80, 94, 282, 156/498; 118/58, 69, 301, 504, 505; 427/140, 398.1, 282, 374.1; 165/76

[56] References Cited

U.S. PATENT DOCUMENTS

| | | | |
|---|---|---|---|
| 4,115,600 | 9/1978 | Schroeder et al. | 427/79 |
| 4,487,643 | 12/1984 | Ellett | 156/80 |
| 5,306,347 | 4/1994 | Semle et al. . | |
| 5,472,559 | 12/1995 | Cayford et al. | 156/554 |

*Primary Examiner*—Geoffrey L. Knable
*Assistant Examiner*—John T. Harn
*Attorney, Agent, or Firm*—Monica H. Choi

[57] ABSTRACT

The present invention protects from excessive heating at least one component on an object during curing of paint at a localized area on the object by exposure to a heat source. The present invention circulates air including cold air near the at least one component to be protected. An air pocket is formed adjacent the at least one component to be protected. This air pocket has an inlet and an outlet. A cold air source is coupled to the inlet via a tubing that directs cold air from the cold air source into the air pocket. Heated air within the air pocket flows out through the outlet of the air pocket such that air circulates through the air pocket. In this manner, the temperature of the at least one component to be protected is maintained below a predetermined temperature when the localized area of the object is exposed to the heat source for curing of the paint at the localized area. In contrast to the prior art, the components to be protected are not removed, discarded, and replaced when repairing a paint imperfection on the object. Thus, the higher cost and added labor associated with such removal and replacement of the heat sensitive components are avoided with the present invention.

21 Claims, 4 Drawing Sheets

PROTECTION FROM EXCESSIVE HEATING OF COMPONENTS ON AN OBJECT DURING CURING OF PAINT ON A LOCALIZED AREA OF THE OBJECT

TECHNICAL FIELD

The present invention relates to repair of paint imperfections, and more particularly to a method and apparatus for protecting from excessive heating of components on an object during exposure of a localized area of the object to a heat source for curing paint on the localized area.

BACKGROUND OF THE INVENTION

The present invention will be described for repairing paint imperfections on automobiles. However, the present invention may be used for repairing paint imperfections on any other articles of manufacture, as would be apparent to one of ordinary skill in the art from the description herein.

Referring to FIG. 1, when a paint imperfection 102 is spotted on an automobile 104, the paint imperfection 102 is repaired. The paint imperfection 102 may be spotted in an inspection process during assembly of the automobile 104 in an manufacturing facility. Alternatively, the paint imperfection 102 may be spotted at an after-market automobile repair shop.

In any case, to repair the paint imperfection 102 such as a scratch or a dent in paint, the localized area on the automobile 104 having the paint imperfection 102 is typically sanded down and coated with the layers of paint and other forms of paint treatment as known in the paint repair industry. The coating of paint and treatment is then cured by exposing the localized area to a heat source 106.

The heat source 106 heats up the localized area and may heat up other components on the automobile 104. For example, if a paint imperfection is located near a rear window 108 of the automobile 104, then the heat source 106 may heat up the rear window 108. The rear window 108 and a rubber molding 110 are coupled to the frame of the automobile via a sealer. If the heat source 106 heats up the rear window 108 and the rubber molding 110, the rubber molding 110 may melt and/or may deform in shape. Such melting and/or deforming of the rubber molding 110 degrades the appearance of the automobile 104. In addition, excessive heating of the rear window 108 may result in deformation and degradation of appearance of the rear window 108.

Thus, in the prior art, the rear window 108 and the rubber molding 110 are removed from the frame of the automobile 104 before curing of the paint by exposure to the heat source 106. Depending on the components removed from the automobile 104, such components may be discarded after removal. In that case, the removed components are replaced with new components. Unfortunately, such removal and replacement in the prior art results in higher cost and added labor during repair of paint imperfection on the automobile 104. Nevertheless, components such as the rear window 108 and the rubber molding 110 that are located near the paint imperfection need protection from excessive heating during curing of paint by exposure to the heat source 106.

In the prior art, protective covers attempt to shield the heat sensitive components from the heat source 106. For example, U.S. Pat. No. 5,472,559 to Cayford et al. discloses a protective tape, and U.S. Pat. No. 5,306,347 to Semle at al. discloses a light weight, disposable enclosure for covering the components on the automobile to be protected during exposure to the heat source 106. However, such protective coverings of the prior art may not be sufficient for preventing melting and/or deformation of the heat sensitive components. For example, if the paint imperfection 102 were substantially near the molding 110, even with a protective covering of the prior art, heat from the localized area may sufficiently conduct to the molding 110 to melt and/or deform the molding 110.

SUMMARY OF THE INVENTION

Accordingly, in light of these disadvantages of the prior art, the present invention is an improved mechanism for protecting from excessive heating components on an object during curing of paint on the object by exposure to a heat source. The present invention circulates air including cold air near the components to be protected.

Generally, the present invention is a method and apparatus for protecting at least one component on an object from excessive heating during curing of paint on a localized area of the object by exposure of the localized area to a heat source. An air pocket is formed adjacent the at least one component to be protected. This air pocket has an inlet and an outlet. A cold air source is coupled to the inlet via a tubing that directs cold air from the cold air source into the air pocket. Heated air within the air pocket flows out through the outlet of the air pocket such that air circulates through the air pocket. In this manner, the temperature of the at least one component is maintained below a predetermined temperature when the localized area of the object is exposed to the heat source for curing of the paint at the localized area.

The present invention may be used to particular advantage when the air pocket is formed by covering the at least one component with a protective material such as by taping aluminum foil around the at least one component. Alternatively, the air pocket may be formed by parts already on the object. On a vehicle (such as an automobile) for example, the air pocket may be formed by a panel and an inner liner of the vehicle.

The cold air source may be a cold air gun having a vortex tube assembly. The tubing between the cold air source and the inlet of the air pocket may be a flexible vinyl manifold having a plurality of holes for directing the cold air from the cold air source into the air pocket.

While the cold air is circulating through the air pocket, the localized area is exposed to the heat source to cure the paint on the localized area of the object. After the curing step, the heat source is removed from the localized area of the object, and the object is cooled. The added components such as the tubing and/or the protective material forming the air pocket may be removed from the object either before or after the object is completely cooled down after the removal of the heat source from the object.

By circulating cold air near the components to be protected in the present invention, the components are not removed from the object for the curing of paint. Thus the high cost and added labor for removal and replacement of such components are avoided with the present invention. In addition, the circulation of cold air near the components to be protected ensures that the temperature at such components remains below a predetermined temperature.

These and other features and advantages of the present invention will be better understood by considering the following detailed description of the invention which is presented with the attached drawings.

BRIEF DESCRIPTION OF THE DRAWINGS

The figures referred to herein are drawn for clarity of illustration and are not necessarily drawn to scale. Elements having the same reference number in FIGS. 1, 2, 3, 4, 5, and 6 refer to elements having similar structure and function.

DETAILED DESCRIPTION

The present invention is described herein for repairing paint imperfections on automobiles. However, the present invention may be used for repairing paint imperfections on any other types of vehicles or on any other types of articles of manufacture, as would be apparent to one of ordinary skill in the art from the description herein.

Figure 1:
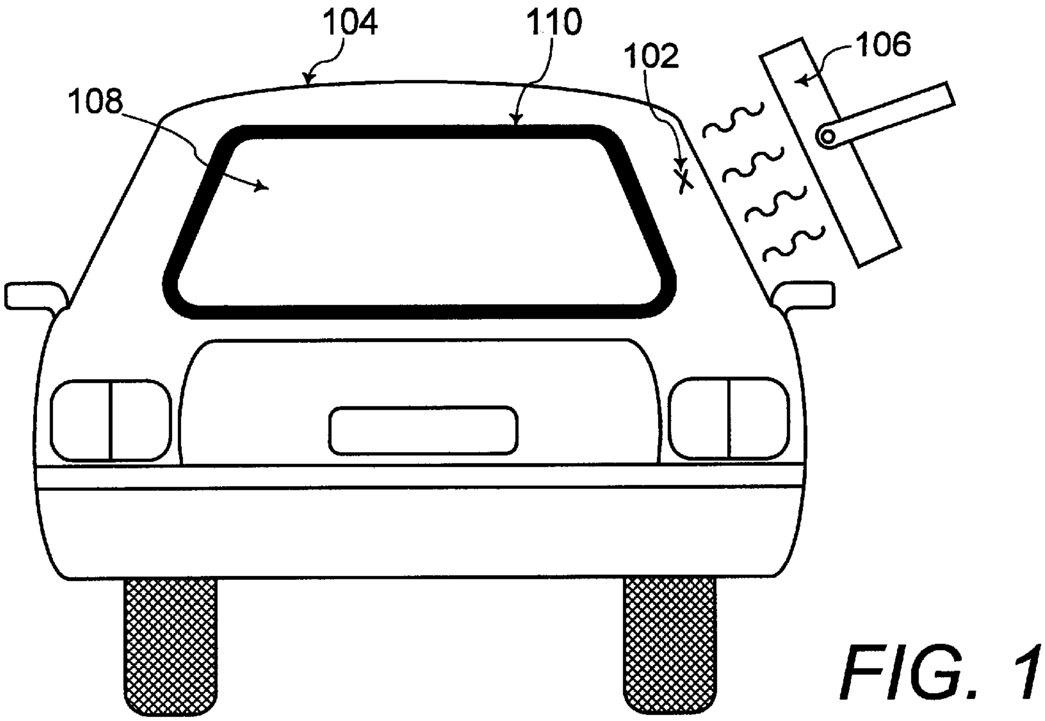
FIG. 1 illustrates curing of paint for repairing a paint imperfection at a localized area on an automobile by exposure of the localized area to a heat source.
Figure 2:
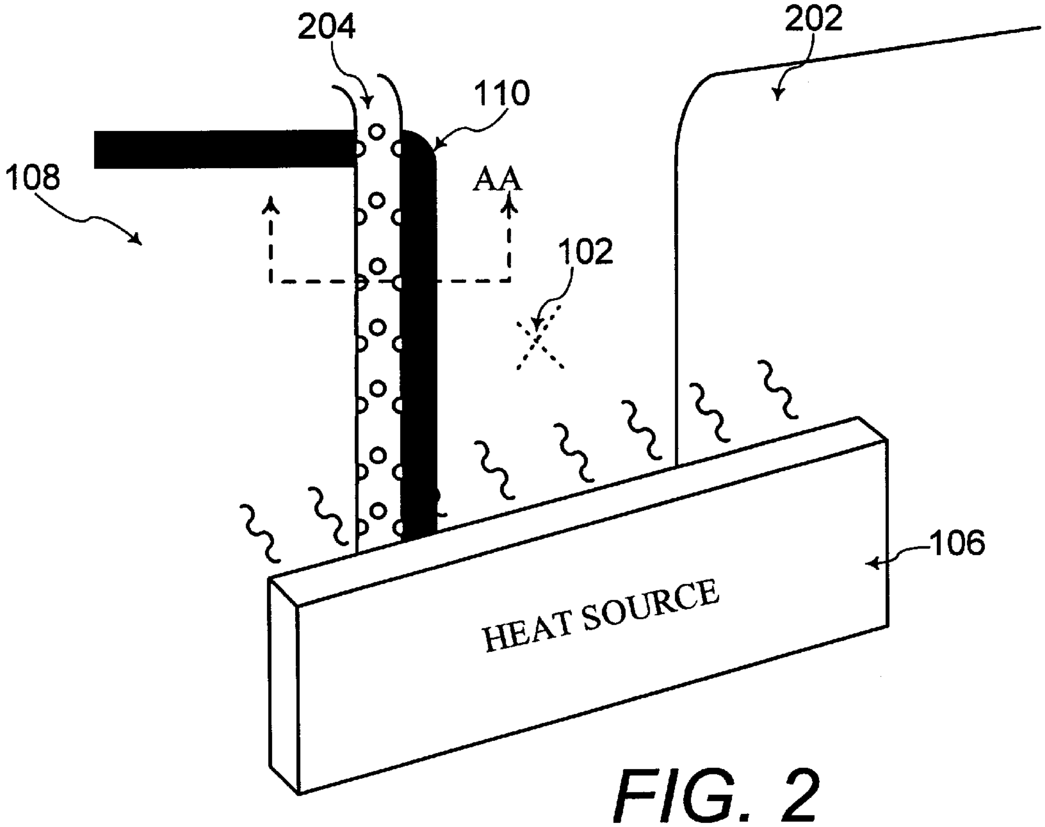
FIG. 2 shows a mechanism for protecting from excessive heating components of the automobile of FIG. 1 during exposure to the heat source, according to an embodiment of the present invention.

Referring to FIG. 2, paint (and/or any other type of treatment used in the paint repair industry) on the localized area having the paint imperfection 102 on the automobile 104 is cured by exposure to the heat source 106. The heat source 106 may be an electric lamp or any other type of heat source used in the paint repair industry.

The present invention is described for protecting the rear window 108 and the rubber molding 110 from excessive heating during the exposure of the localized area to the heat source 106. However, depending on the location of the paint imperfection 102 on the automobile 104, other components, such as a side window 202, a plastic door handle, a trim, a chrome, a headlight, or a tail-light may need protection from excessive heating during exposure to the heat source 106. The present invention may be used for protection of any such components as would be apparent to one of ordinary skill in the art from the description herein.

An air pocket is formed around the components to be protected according to the present invention. A tubing 204 is inserted into the air pocket to circulate cold air through the air pocket. Referring to FIG. 2, the tubing 204 is disposed to be within the air pocket of the present invention. In FIG. 2, an air pocket is formed by covering the components to be protected with a protective material. (The protective material is not shown in FIG. 2 for clarity of illustration.)

In FIG. 2, the tubing 204 may be a flexible vinyl manifold which may be shaped to conform to various surfaces. In FIG. 2, the flexible vinyl manifold has been shaped to abut the rubber molding 110 nearest the localized area having the paint imperfection 102. The tubing 204 is coupled to a cold air source and has a plurality of holes for directing cold air into the air pocket.

In an embodiment of the present invention, a plurality of sets of four holes arc dispersed along the length of the tubing 204. Each of the four holes in a set are displaced 90° from each other along the length of the tubing 204. In FIG. 2, three of such four holes in a set are illustrated with the fourth of the four holes facing toward the rear window 108. In an embodiment of the present invention, one of the four holes faces toward the rubber molding 110 that is located nearest the localized area having the paint imperfection 102.

Figure 3:
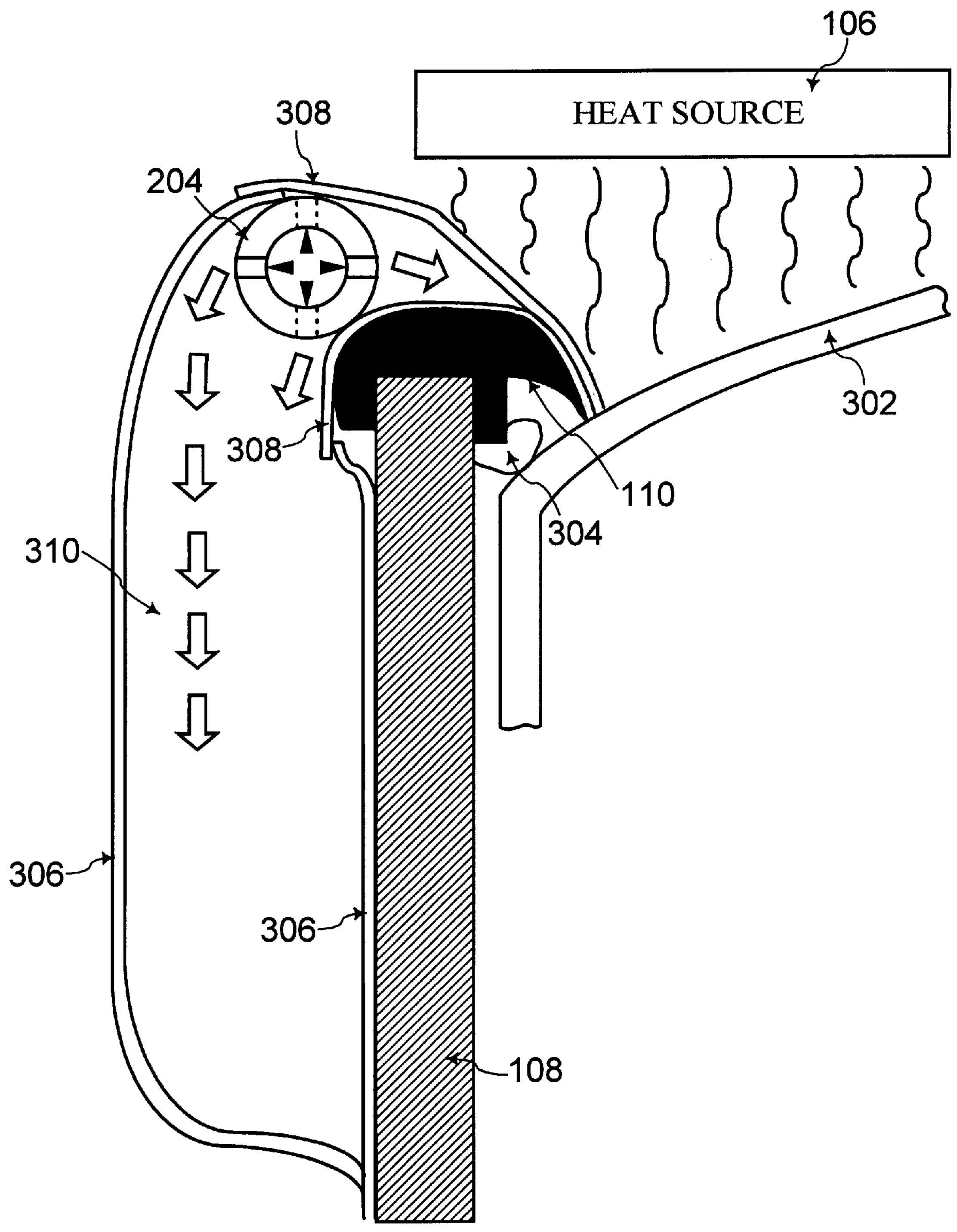
FIG. 3 shows a cross-sectional view of the mechanism of the present invention illustrated in FIG. 2, according to an embodiment of the present invention.

Referring to FIG. 3, a cross-sectional view along line AA in FIG. 2 is shown with the protective material forming the air pocket of the present invention. The glass of the rear window 108 is coupled to a frame 302 of the automobile 104 via the rubber molding 110 and a scaler 304. The heat source 106 is heating the localized area on the frame 302 of the automobile 104 for curing the paint on the localized area having the repaired paint imperfection 102.

The air pocket of the present invention is formed by covering the components to be protected with a protective material. The protective material may be aluminum foil or any other type of material known to one of ordinary skill in the art as being heat reflective. Pieces of aluminum foil 306 are taped adjacent to the components to be protected with pieces of tape 308. In this manner, an air pocket 310 is formed with the taped aluminum foil, and the air pocket 310 is substantially adjacent the components to be protected including the glass of the rear window 108, the rubber molding 110, and the sealer 304.

Figure 4:
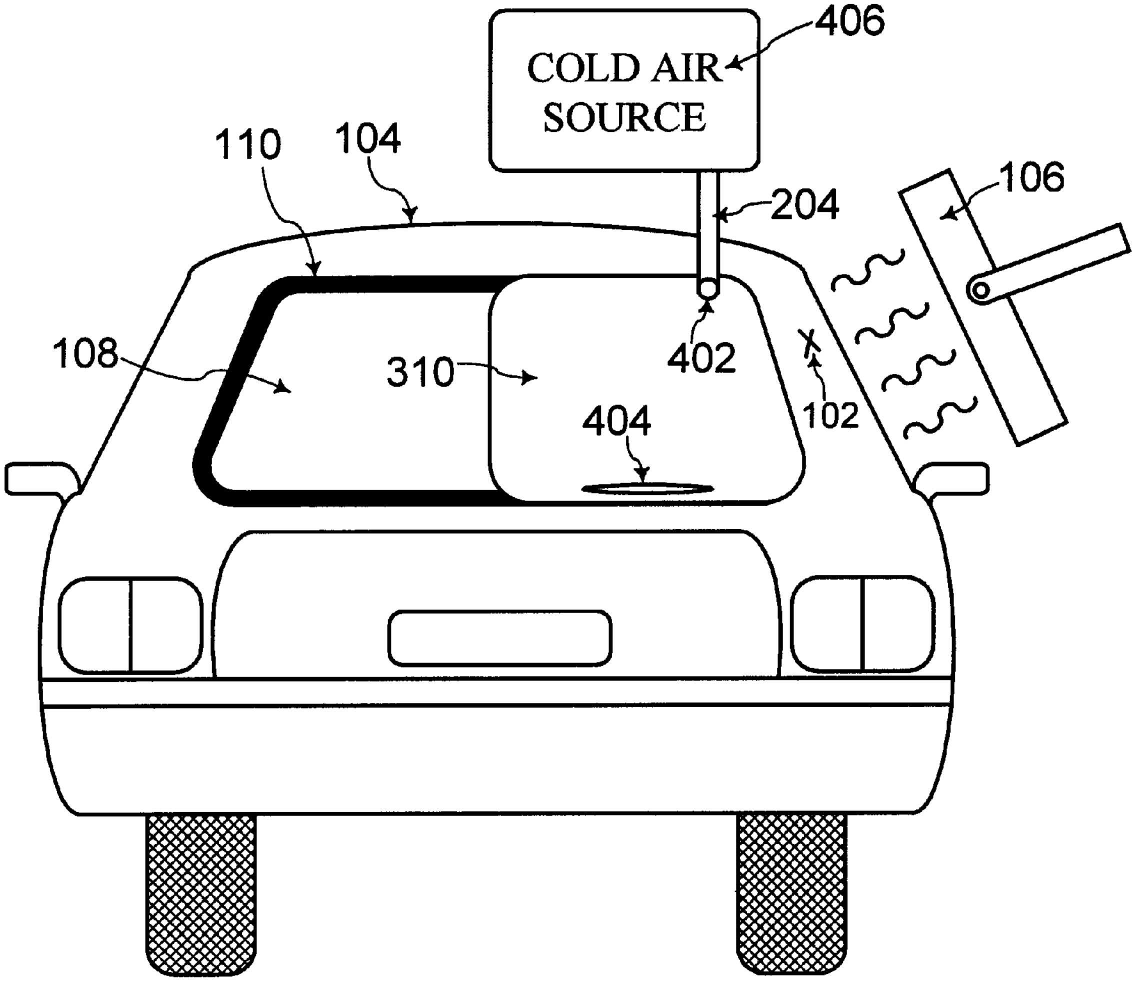
FIG. 4 shows a top view of the mechanism of the present invention illustrated in FIGS. 2 and 3, according to an embodiment the present invention.

FIG. 4 is a top view of the cross sectional components of FIG. 3. Referring to FIG. 4, with the air pocket 310 thus formed, an inlet 402 and an outlet 404 are also formed in the air pocket 310. The tubing 204 is coupled to a cold air source 406 and is inserted into the air pocket 310 via the inlet 402. Referring to FIGS. 2 and 3, the tubing 204 , which is a flexible vinyl manifold, may be taped to conform to the rubber molding 110 located near the localized area being heated. Referring to FIG. 3, the cross-sectional view of the tubing 204 shows four holes that are displaced 90° from each other along the length of the tubing. In an embodiment of the present invention, one of the four holes substantially faces the rubber molding 110.

Referring to FIG. 4, note that the air pocket 310 is formed toward the right side of the rear window 108 adjacent the localized area to be heated. The left side of the rear window 108 that is not covered with the air pocket is substantially far from the localized area and does not need to be protected.

The plurality of holes in the tubing 204 direct compressed cold air from the cold air source 406 into the air pocket 310. As the heat source 106 emits heat toward the frame 302 of the automobile 104, the air within the air pocket 310 heats up. This heated air flows out of the outlet 404 of the air pocket 310 as more compressed cold air is directed into the air pocket 310. The force of the flow of the compressed cold air pushes the heated air out of the outlet 404. Thus, air is circulated through the air pocket 310 as more compressed cold air enters the air pocket 310 via the inlet 402 and as heated air exits the air pocket 310 via the outlet 404.

The cold air source 406 may be a cold air gun having a vortex tube assembly as described in U.S. Pat. No. 4,240,261 to Inglis. U.S. Pat. No. 4,240,261 to Inglis is incorporated herewith by reference. Alternatively, the cold air source 406 may be any other type of cold air source as known to one of ordinary skill in the art. In a preferred embodiment of the present invention, the cold air source 406 provides compressed cold air for better air circulation through the air pocket 310.

In this manner, with circulation of cold air adjacent components to be protected, the temperature of such components is controlled to be below a predetermined temperature. Thus, the components are protected from excessive heating. For example, the temperature of the glass of the rear window 108, the molding 110, and the sealer 304 that are near the localized area to be heated is controlled to be below the predetermined temperature during exposure of the localized area to the heat source 106. As a result, melting and/or deforming of such components during heating of the localized area is prevented.

In contrast to the prior art, such components are not removed, discarded, and replaced during repair of a paint imperfection on the automobile. Thus, the higher cost and added labor associated with removal and replacement of heat sensitive components are avoided with the present invention. The method and apparatus of the present invention may be used during the manufacturing of the automobile 104 when inspection of the automobile 104 reveals the paint imperfection 102. Alternatively, the present invention may be used in an after-market automobile repair shop.

After curing the paint by exposure of the localized area to the heat source 106, the heat source 106 is removed. The localized area of the automobile 104 is cooled down. The protective material and the tubing forming the air pocket 310 may be removed before the cooling down of the localized area. Alternatively, the protective material and the tubing 204 may remain during the cooling down of the localized area such that cold air may continue to circulate through the air pocket 310 while the localized area cools down. Once the localized area has cooled down sufficiently, the protective material forming the air pocket 310 and the tubing 204 are removed from the automobile 104. The curing of the paint at the localized area is substantially complete at this point, and the heat sensitive components have been protected from excessive heating.

Figure 5:
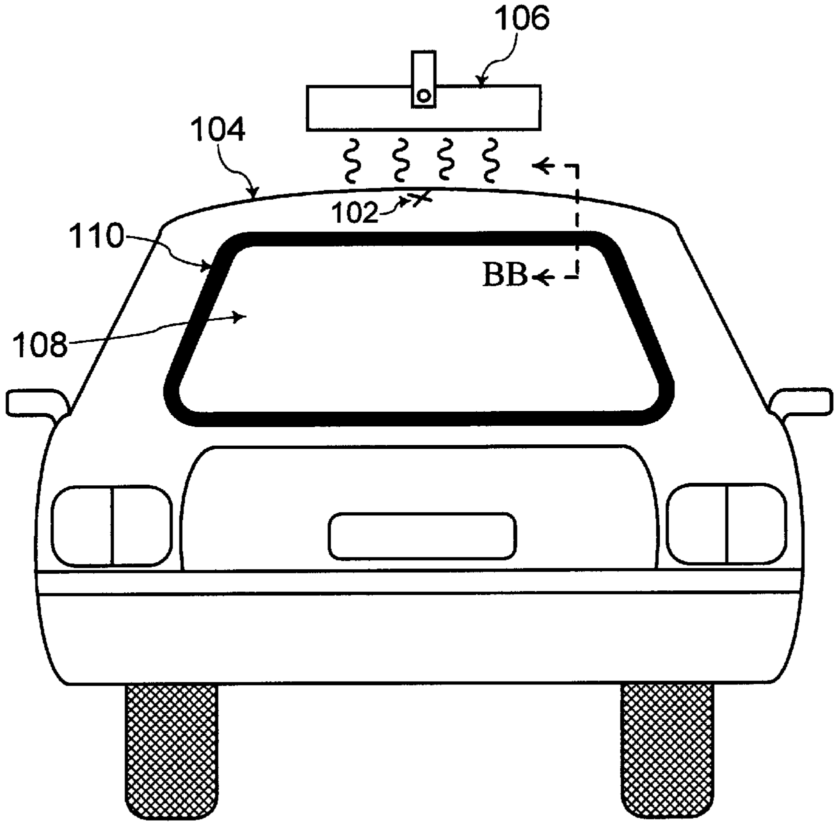
FIG. 5 shows forming an air pocket with existing components on an object, according to another embodiment of the present invention.
Figure 6:
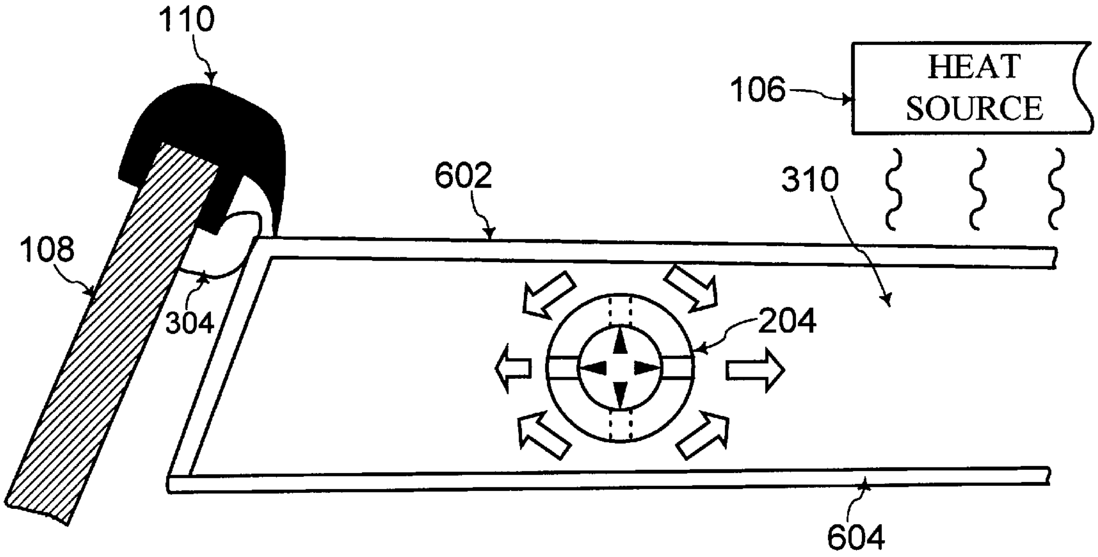
FIG. 6 shows a cross-sectional view of the embodiment of the present invention illustrated in FIG. 5.

In an alternative embodiment of the present invention, the air pocket 310 is formed by components already present on the automobile. Referring to FIGS. 5 and 6, if the paint imperfection 102 is located substantially far from the rear window 108 and the rubber molding 110, then the air pocket may be formed by a panel 602 and an inner lining 604 already present on the automobile 104 to protect the glass of the rear window 108 and the rubber molding 110 from excessive heating. FIG. 6 is a cross-sectional view along line BB of the automobile 104 in FIG. 5. Additionally, such an air pocket 310 may be desirable for preventing deformation of the panel 602 when the panel is comprised of a sheet metal. Unattractive sink marks (which resemble small dents) may form on the sheet metal of the panel 602 with excessive heating of the panel. The liner 604 may be comprised of plastic material which may easily deform with heating. Flowing cold air through the pocket formed by the panel 602 and liner 604 prevents deformation of such parts on the automobile when such parts are comprised of material that easily deforms with heating. Additionally, in such an embodiment of the present invention, the air pocket is formed by already existing components on the automobile, and additional protective material is not needed for forming the air pocket.

The foregoing is by way of example only and is not intended to be limiting. The rear window 108, the rubber molding 110, and the sealer 304 are examples of components on the automobile 104 that are protected from excessive heating during curing of paint on a localized area by exposure of the localized area to the heat source 106. However, depending on the location of the paint imperfection 102 on the automobile 104, other components, such as a plastic door handle, a trim, a chrome, a headlight, or a tail-light may need protection from excessive heating during exposure to the heat source 106. The present invention may be used for protection of any such components on the automobile, as would be apparent to one of ordinary skill in the art from the description herein.

The present invention is described herein for repairing paint imperfections on automobiles. However, the present invention may be used for repairing paint imperfections on any other types of vehicles or on any other types of articles of manufacture, as would be apparent to one of ordinary skill in the art from the description herein.

Therefore, the present invention is limited only as defined in the following claims and equivalents thereof.

I claim:

1. A method of protecting at least one component on an object from excessive heating during curing of paint on a localized area of the object by exposure of the localized area to a heat source, the method including the steps of:

A. forming an air pocket adjacent the at least one component, wherein step A further includes the step of:

covering the at least one component with a protective material to form the air pocket with the protective material;

B. forming an inlet and an outlet in the air pocket; and

C. circulating air through the air pocket by feeding in cold air through the inlet, and wherein heated air within the air pocket flows out through the outlet such that temperature of the at least one component remains below a predetermined temperature when the localized area of the object is exposed to the heat source.

2. The method of claim 1, further including the steps of:

heating the localized area to cure the paint on the localized area by exposing the localized area to the heat source;

removing the heat source from the localized area of the object and cooling the object;

stopping the circulation of air through the air pocket; and removing the protective material forming the air pocket from the object.

3. The method of claim 1, further including the steps of:

heating the localized area to cure the paint on the localized area by exposing the localized area to the heat source;

removing the heat source from the localized area of the object;

stopping the circulation of air through the air pocket;

removing the protective material forming the air pocket from the object; and cooling the object.

4. The method of claim 1, wherein step A further includes the step of:

taping aluminum foil around the at least one component to form the air pocket with the taped aluminum foil.

5. The method of claim 1, wherein step C further includes the step of:

inserting through the inlet a flexible vinyl manifold having a plurality of holes for directing cold air from a cold air source into the air pocket.

6. The method of claim 5, wherein the cold air source is a cold air gun having a vortex tube assembly.

7. The method of claim 1, wherein the object is a vehicle, and wherein the at least one component includes a window glass coupled to the vehicle via a rubber molding and a sealer.

8. The method of claim 1, wherein the object is a vehicle, and wherein the at least one component includes at least one of a plastic door handle, a trim, a chrome, a headlight, and a tail-light.

9. The method of claim 1, further including the steps of:

heating the localized area to cure the paint on the localized area by exposing the localized area to the heat source;

removing the heat source from the localized area of the object and cooling the object; and stopping the circulation of air through the air pocket.

10. The method of claim 1, further including the steps of:

heating the localized area to cure the paint on the localized area by exposing the localized area to the heat source;

removing the heat source from the localized area of the object;

stopping the circulation of air through the air pocket; and cooling the object.

11. A method of protecting at least one component on an object from excessive heating during curing of paint on a localized area of the object by exposure of the localized area to a heat source, the method including the steps of:

A. forming an air pocket adjacent the at least one component;

B. forming an inlet and an outlet in the air pocket; and

C. circulating air through the air pocket by feeding in cold air through the inlet, and wherein heated air within the air pocket flows out through the outlet such that temperature of the at least one component remains below a predetermined temperature when the localized area of the object is exposed to the heat source;

wherein the object is a vehicle, and wherein the air pocket is formed by a panel and an inner liner of the vehicle.

12. A method of curing paint on a localized area of a vehicle by exposing the localized area to a heat source, the vehicle having at least one component that is protected from excessive heating, the method including the steps of:

A. taping aluminum foil around the at least one component to form an air pocket adjacent the at least one component with the taped aluminum foil;

B. forming an inlet and an outlet in the air pocket;

C. inserting through the inlet a flexible vinyl manifold having a plurality of holes for directing cold air, from a cold air gun having a vortex tube assembly, into the air pocket, wherein heated air within the air pocket flows out through the outlet such that air is circulated through the air pocket and such that temperature of the at least one component remains below a predetermined temperature when the localized area of the vehicle is exposed to the heat source;

D. heating the localized area to cure the paint on the localized area by exposing the localized area to the heat source;

E. removing the heat source from the localized area of the vehicle and cooling the vehicle;

F. stopping circulation of air through the air pocket; and

G. removing the taped aluminum foil forming the air pocket from the vehicle.

13. A method of protecting at least one component on an object from excessive heating during curing of paint on a localized area of the object by exposure of the localized area to a heat source, the method including the steps of:

A. forming an air pocket adjacent the at least one component;

B. forming an inlet and an outlet in the air pocket; and

C. circulating air through the air pocket by feeding in cold air through the inlet, and wherein heated air within the air pocket flows out through the outlet such that temperature of the at least one component remains below a predetermined temperature when the localized area of the object is exposed to the heat source;

wherein said air pocket having said cold air circulated therein makes contact with said at least one component to be protected from excessive heating.

14. The method of claim 13, wherein step A further includes the step of:

covering the at least one component with a protective material to form the air pocket with the protective material.

15. The method of claim 14, further including the steps of:

heating the localized area to cure the paint on the localized area by exposing the localized area to the heat source;

removing the heat source from the localized area of the object and cooling the object;

stopping the circulation of air through the air pocket; and removing the protective material forming the air pocket from the object.

16. The method of claim 14, further including the steps of:

heating the localized area to cure the paint on the localized area by exposing the localized area to the heat source;

removing the heat source from the localized area of the object;

stopping the circulation of air through the air pocket;

removing the protective material forming the air pocket from the object; and cooling the object.

17. The method of claim 14, wherein step A further includes the step of:

taping aluminum foil around the at least one component to form the air pocket with the taped aluminum foil.

18. The method of claim 13, wherein step C further includes the step of:

inserting through the inlet a flexible vinyl manifold having a plurality of holes for directing cold air from a cold air source into the air pocket.

19. The method of claim 13, wherein the object is vehicle, and wherein the at least one component includes a window glass coupled to the vehicle via a rubber molding and a sealer.

20. The method of claim 13, wherein the object is a vehicle, and wherein the at least one component includes at least one of a plastic door handle, a trim, a chrome, a headlight, and a tail-light.

21. The method of claim 13, wherein the object is a vehicle, and wherein the air pocket is formed by a panel and an inner liner of the vehicle.

* * * * *